(12) United States Patent
Kang

(10) Patent No.: US 6,577,337 B1
(45) Date of Patent: Jun. 10, 2003

(54) DISPLAY APPARATUS FOR VISUAL COMMUNICATION

(75) Inventor: Min-Su Kang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/203,668

(22) Filed: Dec. 1, 1998

(30) Foreign Application Priority Data

Dec. 1, 1997 (KR) .............................. 97-65103
Jul. 28, 1998 (KR) .............................. 98-30440

(51) Int. Cl.[7] ......................................... H04N 05/225
(52) U.S. Cl. ................... 348/207.1; 348/14.08; 348/211.3; 348/375; 348/552; 348/222.1
(58) Field of Search ......................... 348/14.01, 14.04, 348/207, 211, 212, 222, 231, 232, 233, 552, 207.99, 207.1, 211.99, 211.1, 211.2, 211.3, 211.4; 709/253, 321, 322, 323; 710/62, 63, 65, 69–74

(56) References Cited

U.S. PATENT DOCUMENTS

| | | | | | |
|---|---|---|---|---|---|
| 5,568,192 A | * | 10/1996 | Hannah | ....................... | 348/222 |
| 5,787,259 A | * | 7/1998 | Haroun | ....................... | 348/552 |
| 5,797,028 A | * | 8/1998 | Gulick | ....................... | 712/52 |
| 5,818,948 A | | 10/1998 | Gulick | ....................... | 712/32 |
| 5,991,546 A | * | 11/1999 | Chan | ....................... | 710/62 |
| 6,005,613 A | * | 12/1999 | Endsley | ....................... | 348/231 |
| 6,061,089 A | * | 5/2000 | Tonkin | ....................... | 348/211 |
| 6,084,638 A | * | 7/2000 | Hare | ....................... | 348/552 |
| 6,104,430 A | * | 8/2000 | Fukuoka | ....................... | 348/232 |
| 6,137,526 A | * | 10/2000 | Kakii | ....................... | 348/14.16 |
| 6,256,687 B1 | * | 7/2001 | Ellis | ....................... | 710/71 |
| 6,275,375 B1 | * | 8/2001 | Nam | ....................... | 361/682 |
| 6,285,398 B1 | * | 9/2001 | Shinsky | ....................... | 348/223 |
| 2001/0001563 A1 | * | 5/2001 | Tomaszewski | ....................... | 348/552 |

* cited by examiner

Primary Examiner—Ngoc-Yen Vu
(74) Attorney, Agent, or Firm—Robert E. Bushnell, Esq.

(57) ABSTRACT

The present invention relates to a method of a video and audio data signal processing with a display apparatus for a visual communication systems. The display apparatus is coupled to a universal serial bus (USB) hub root and a host equipped with a communication interface. A digital camera and a memory are coupled to a digital signal processor (DSP). The digital video data signal generated from the digital camera is stored in the memory and directly processed in the DSP. A USB hub system receives the video data signal with parallel and transmits the video data signal to the host with serial by a USB protocol. The USB hub system also receives the audio data signal with serial and transmits the audio data signal to the DSP with parallel. In the display apparatus for the visual communication systems, the DSP receives the digital video data signal acquired from the digital camera and directly processes the digital video data signal. Therefore, the display apparatus executes the visual communication with more clear video data signal by a simple connection and a noise exclusion. The display apparatus also avoids overlapping data conversion devices such as sound controller and image capture device in these video and audio data signals transmission with the host.

17 Claims, 9 Drawing Sheets

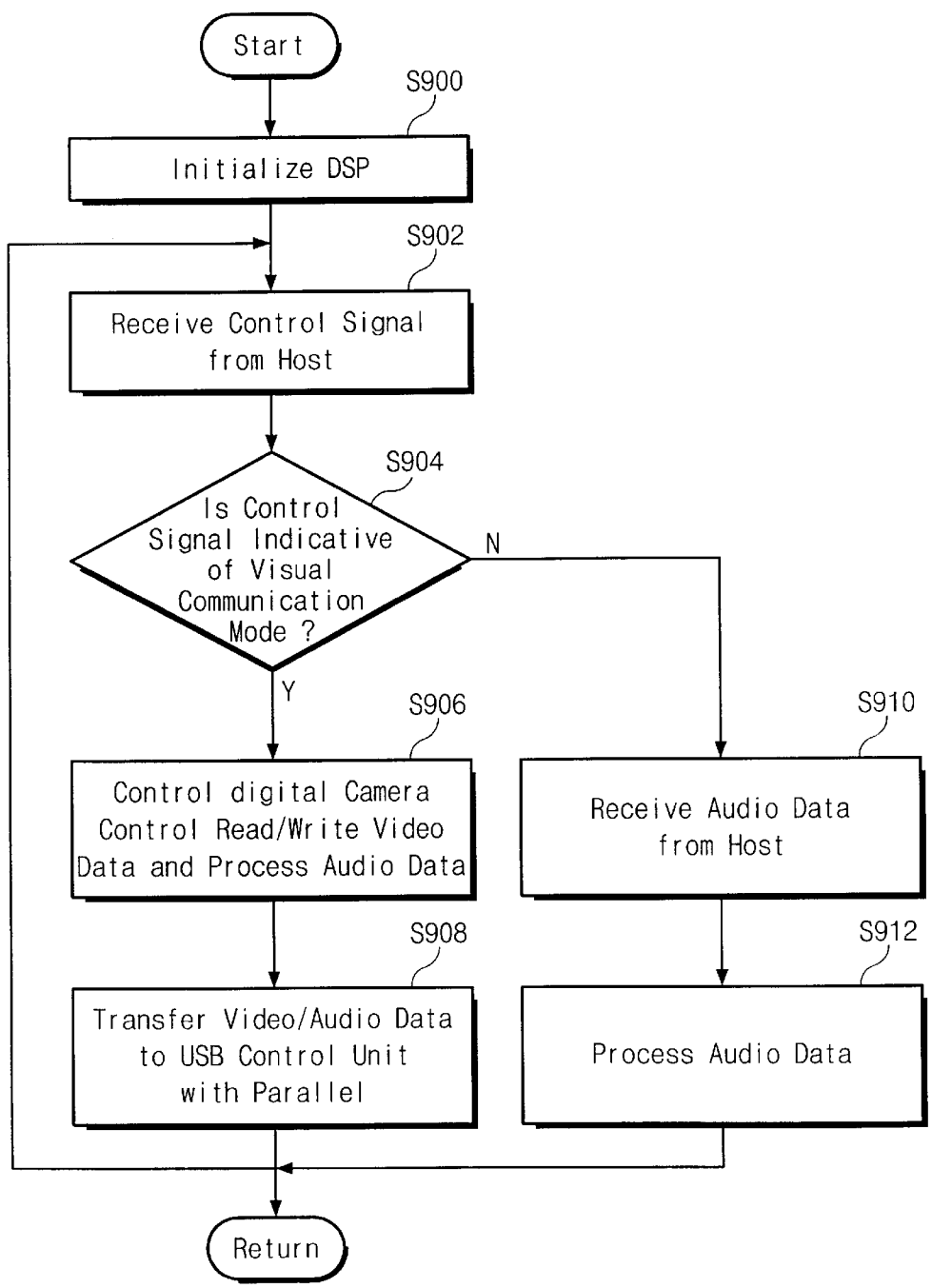

DISPLAY APPARATUS FOR VISUAL COMMUNICATION

CLAIM OF PRIORITY

This application makes reference to, incorporates the same herein, and claims all benefits accruing under 35 U.S.C §119 from an application entitled *Display Apparatus For Visual Communication* earlier filed in the Korean Industrial Property Office on Dec. 1, 1997, and there duly assigned Ser. No. 97-65103 by that Office.

FIELD OF THE INVENTION

The present invention relates to a display apparatus for a visual communication system, and more particularly to the display apparatus for visual communication system which includes a digital signal processor(DSP) for digital video data signal and analog audio signal processing and sends the resultant data to a host through a universal serial bus (USB) hub interface.

BACKGROUND OF THE INVENTION

Referring to FIGS. 1 and 2, a conventional computer system for a visual communication is illustrated. In this computer system, a monitor 20 is connected to a host (computer) 10 via universal serial bus (USB) cable 22 and the keyboard 70, mouse 60, microphone 50, speakers 40 and 42 and camera 30 are all connected to host 10 via respective cables. An analog video signal acquired from an analog camera 30 is converted into digital video data and is composed of an international standard form video data signal for the visual communication by an image capture device 15 included in host 10. The analog audio signal acquired from microphone 50 is also composed of an international standard form audio signal for the visual communication by a sound controller 14 included in the host 10. These video and audio signals are compressed and decompressed for visual communication and transmitted through a communication interface unit 16, such as a modem. The computer system converts these analog video and audio signals into these digital video and audio data by these analog-to-digital converting devices such as the sound controller 14 and the image capture device 15 included in the system, and converts received digital and audio data to corresponding analog signals for output via display unit 20 and speakers 40 and 42, respectively. Since the system has overlapping these data conversion devices, cost and data loss are increasing in the several process of data conversion. Furthermore, since the system has complex connecting lines between peripheral devices and the host unit 10 in the analog data transmission processing, the system has much noise in the data signal.

Examples of a display apparatus for a visual communication system which includes universal serial bus (USB) architecture are provided by U.S. Pat. No. 5,797,028 to Dale E. Gulick et al. entitled *Computer System Having An Improved Digital And Analog Configuration*, and U.S. Pat. No. 5,818,948 to Dale E. Gulick entitled *Architecture for A Universal Serial-Based Speaker Controller*.

SUMMARY OF THE INVENTION

It is therefore an object of the present invention to solve the above mentioned problems and to provide a display apparatus for a visual communication system which is capable of direct processing of these digital video and audio data signals.

It is another object of the invention to solve the above mentioned problems and to provide a display apparatus for the visual communication system which is capable of providing of these digital video and audio data signals through a USB system.

In order to attain the above objects, according to an aspect of the present invention, there is provided a digital camera for generating a digital video data signal, a memory for storing the digital video data signal and a digital signal processor(DSP) for controlling the digital camera operation and a read/write operation of the memory while controlling the digital video data signal transference between the memory and the host.

According to another aspect of this invention, there is provided a USB control unit for controlling the digital video data signal transmission between the host and the DSP through at least one USB hub port.

In the display apparatus for the visual communication system according to the invention, the DSP receives directly the digital video data signal acquired from the digital camera and the audio data signal acquired from a microphone through the USB hub.

Furthermore, in the display apparatus, the DSP transfers these video and audio data signals to the host through the USB hub system with a parallel or serial format, which data signals are converted by an A/D converter and a D/A converter.

An advantage of this invention is that it avoids overlapping data conversion devices such as a sound controller and an image capture device and avoids complex connection between the host and these peripheral devices.

Further advantage of this invention is that it executes the visual communication with clearer data directly by the DSP through the USB hub.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 9 is a flowchart illustrating a processing of DSP shown in FIG. 6.

DESCRIPTION OF THE PREFERRED EMBODIMENT

Figure 1:
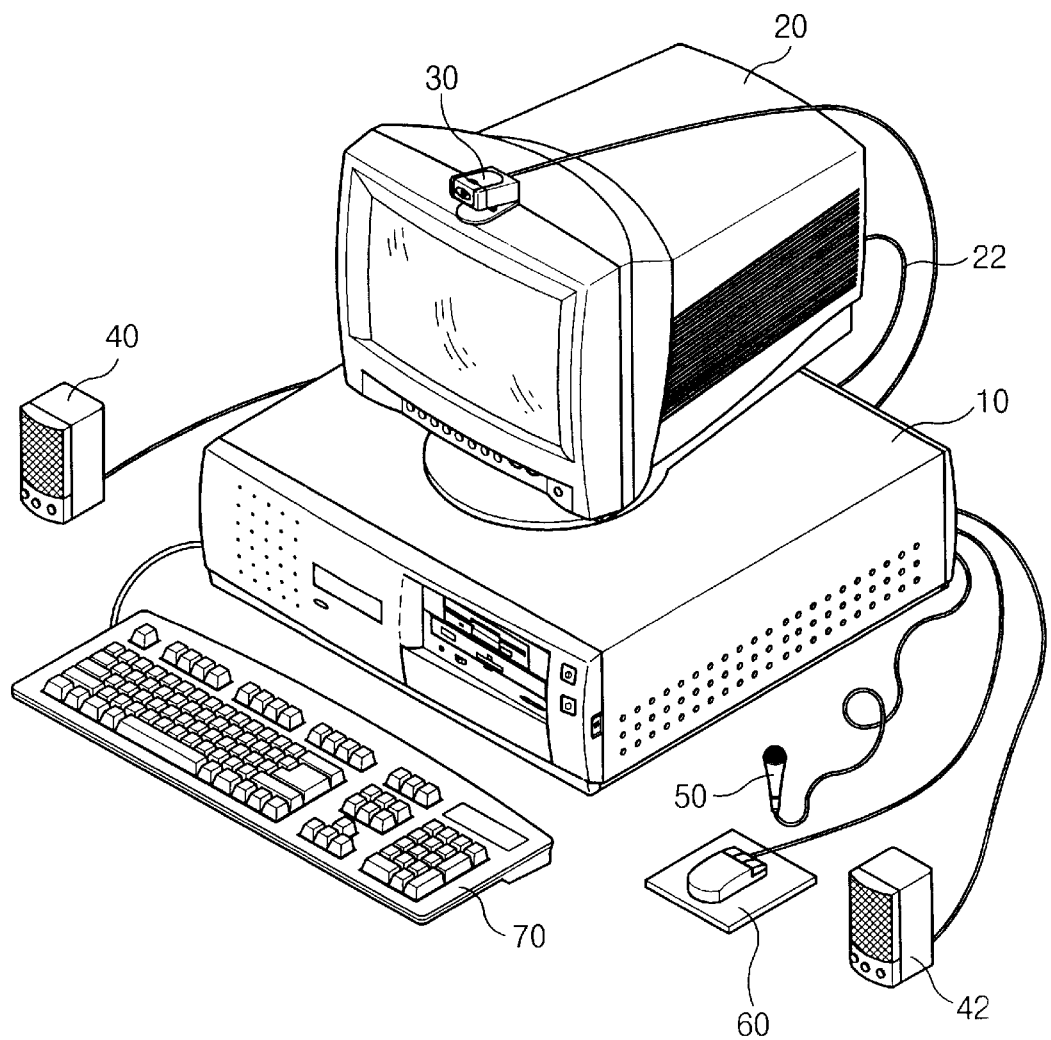
FIG. 1 is a perspective view illustrating a conventional computer system for general visual communication.
Figure 2:
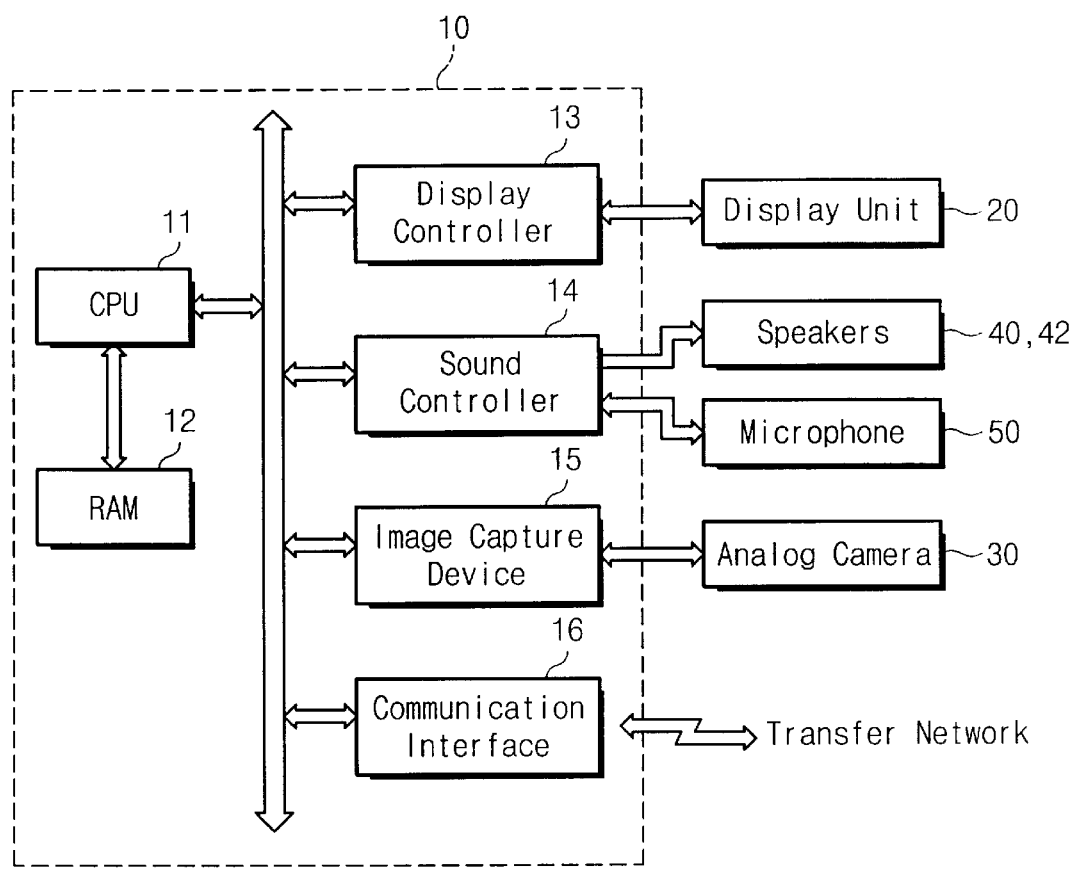
FIG. 2 is a block diagram illustrating details of the computer system of FIG. 1.
Figure 3:
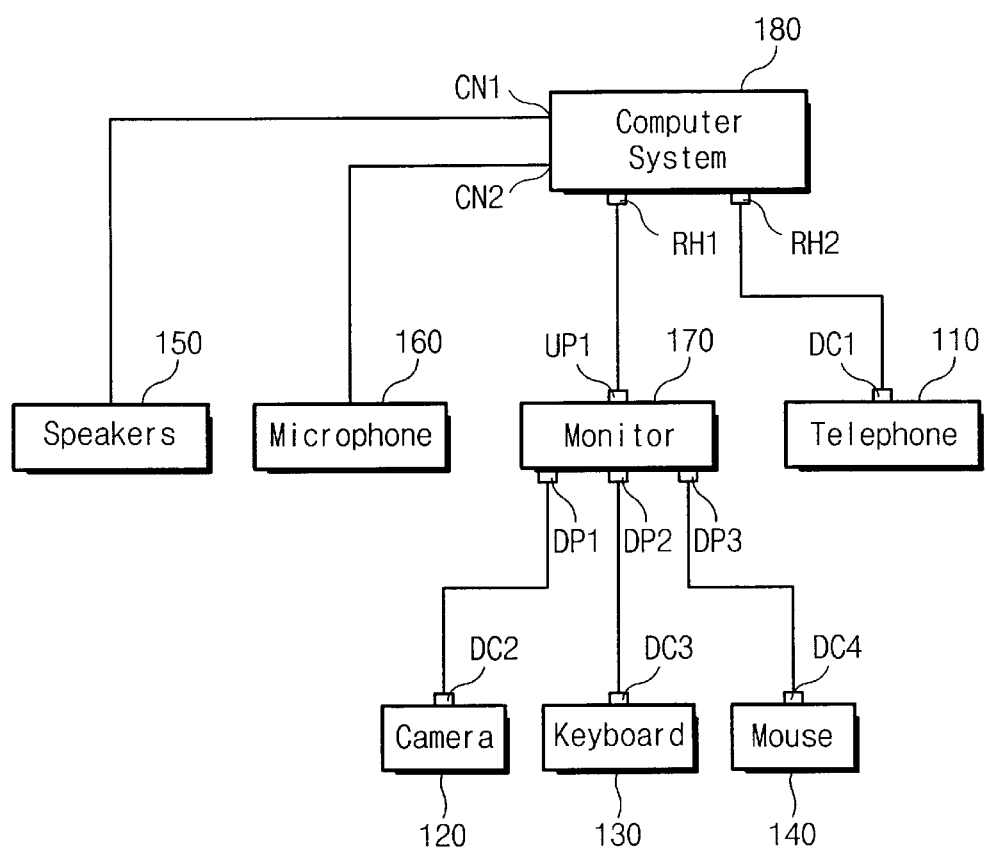
FIG. 3 is a block diagram illustrating an envisioned computer system for general visual communication.

An envisioned computer system for visual communication is illustrated in FIG. 3. This computer system uses a universal serial bus (USB) in the data processing for solving the complex connecting line problems in the computer system in FIG. 1. In this computer system, as shown in FIG. 3, the digital video data signal is transferred from a camera 120 coupled to a monitor 170 to the host 180 through USB ports DC2 and DP1 (downstream port), the keyboard is coupled to monitor 170 via USB ports DC3 and DP2 and the mouse is coupled to monitor 170 via USB ports DC4 and DP3. The host 180 carries out the communication with the above mechanisms via ports RH1 (a USB root hub) and UP1 (upstream port). A telephone is connected to host 180 via ports RH2 and DC1 The system still has a noise problem because the microphone 160 and a speaker unit 150 for transmitting and receiving the analog audio signals are connected with the host 180 through audio input/output terminals CN1 and CN2 in the sound controller included in the host 180. Since the audio signal is transmitted from the host 180 with an analog format, a realization of noise filtering and a sound effect function such as a stereo sound, a tone, a balance and so forth in the monitor 170 are difficult.

Figure 4:
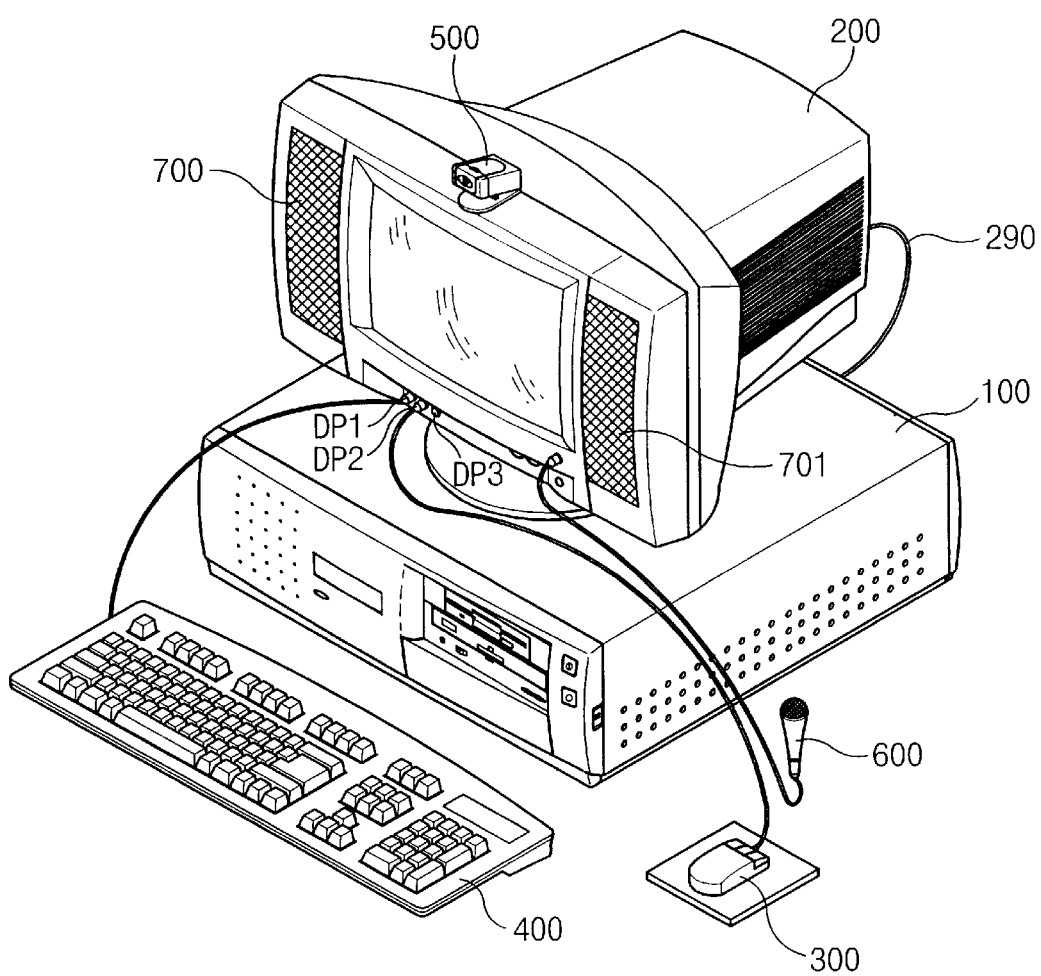
FIG. 4 is a perspective view illustrating a computer system including a display apparatus for visual communication systems according to the present invention.
Figure 5:
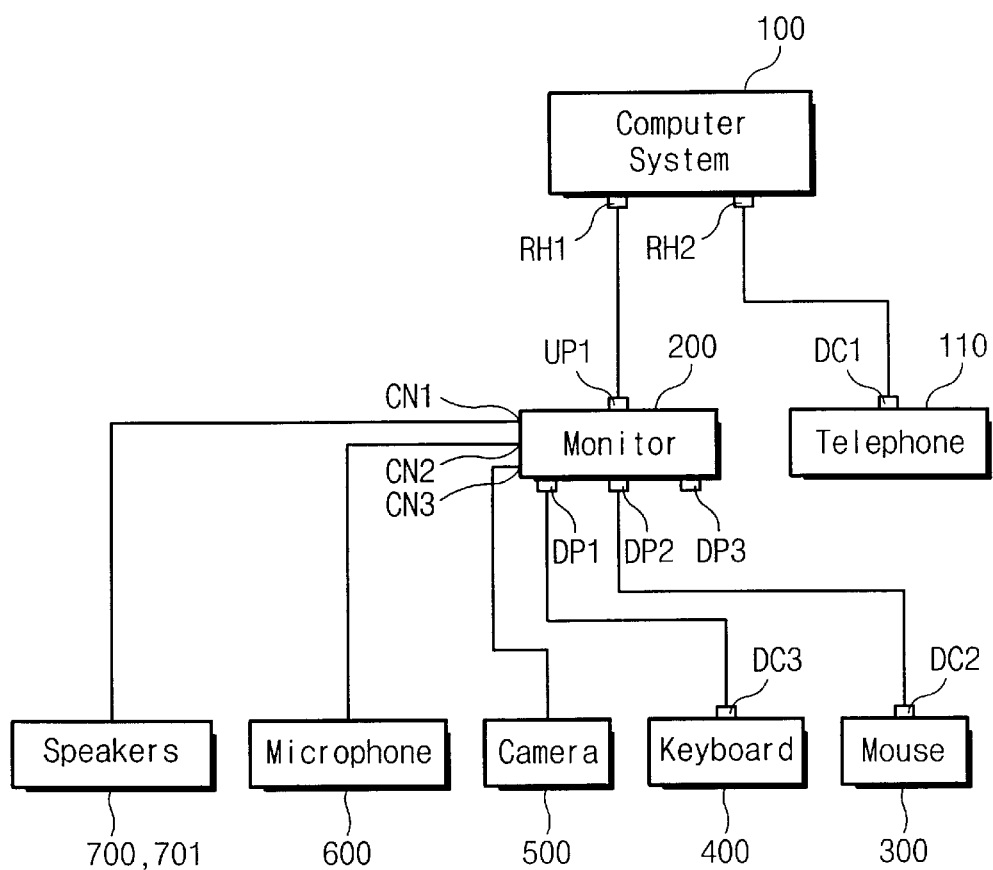
FIG. 5 is a block diagram illustrating a configuration of the computer system shown in FIG. 4.

In FIG. 4 and FIG. 5, there is shown a visual communication system in accordance with the principles of the present invention. Referring FIG. 4, a host 100 is coupled to a monitor 200 through a USB cable 290 in the visual communication system. A keyboard 400, a mouse 300, a digital camera 500, a microphone 600 and a speakers 700 and 701 are coupled to monitor 200.

As shown in FIG. 5, the host 100 comprises two USB root hubs RH1 and RH2. USB root hub RH1 is coupled to an upstream port UP1 included in the monitor 200, and USB root hub RH2 is coupled to a telephone via port DC1. Downstream ports DP2 and DP1 included in the monitor 200 are coupled to a USB mouse 300 and a USB keyboard 400 via the USB hub ports DC2 and DC3. The USB hub included in the monitor 200 is a self-powered device, which can supply a power to these USB devices coupled to the USB hub such as the USB mouse 300 and the USB keyboard 400. The digital camera 500, the microphone 600 and the speakers 700 and 701 are directly connected to a DSP (denoted by the reference numeral 230 in FIG. 6) included in the monitor 200. The monitor 200 executes the visual communication in a visual communication mode or executes an audio signal processing in a common mode in response to a control signal of the host 100. The DSP 230 manages the audio data signal such as a tone, a balance, a volume and a stereo sound transmitted from the host 100 through the USB hub.

Figure 6:
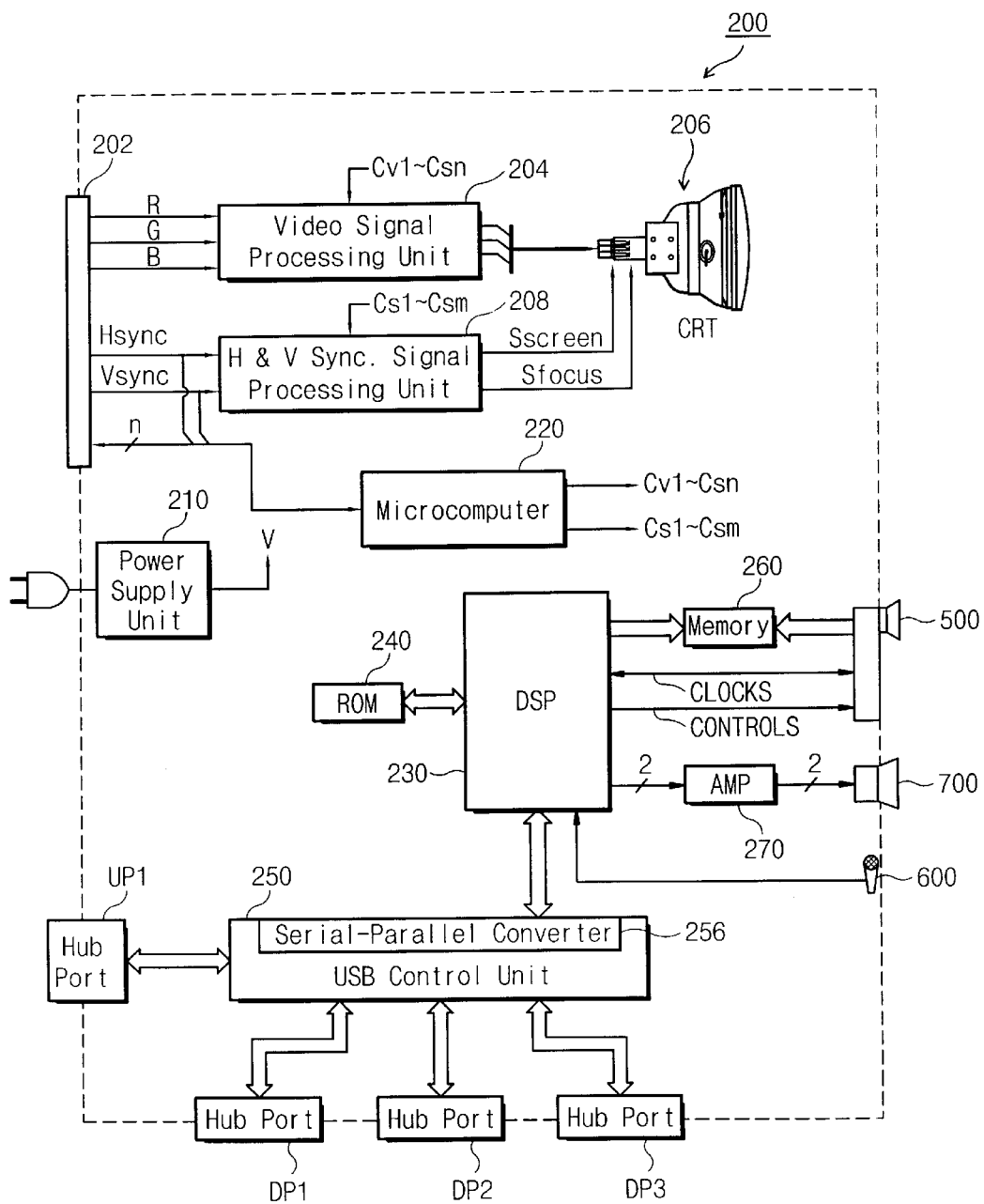
FIG. 6 is a block diagram illustrating a configuration of a display apparatus according to the present invention shown in FIG. 4.

Referring FIG. 6, a detailed circuit configuration of the monitor 200 is illustrated. As shown in FIG. 6, a power supply unit 210 is included in the monitor 200 supplied a voltage via a power plug. The power supply unit 210 supplies a variety of voltages to the circuit of the monitor 200 and has a power management function for an electric power saving operation. The monitor 200 also comprises a video data signal processing unit 204, a horizontal and vertical synchronizing signal processing unit 208, a microcomputer 220 adapted to control these overall signals for operating the monitor 200, and a cathode ray tube(CRT) 206. The monitor further comprises the DSP 230 for the visual communication and the USB hub system 250 being equipped with the upstream port UP1 and the downstream ports DP1, DP2 and DP3. The digital camera 500 and a memory 260 are coupled to the DSP 230. The microphone 600 and the speaker unit 700 and 701 are connected to the monitor 200 or may integrated into the housing of the monitor 200. The operation of the above mentioned units are controlled by a programmed read only memory (ROM) 240.

ROM 240 may be located within DSP 230 or external DSP 230. Similarly, DSP 230 may be a component of microcomputer 220. The DSP 230 executes overall operations in the visual communication mode or the common mode by a program stored in ROM 240. The digital camera 500 generates several clocks having a frame information for adjusting the video data signal or controlling several registers (not shown) included in the digital camera. The DSP 230 executes control operations for generating an international standard form video data signal or controlling an up/down moving operation and a left/right moving operation of the digital camera 500 by receiving of these clocks. The DSP 230 executes additional functions such as a zooming function and a focusing function of the digital camera 500. The memory 260 receives an address and the control signal generated by the DSP 230 for a read/write operation of the video data signal and stores the digital video data signal generated by the digital camera 500. For instance, the digital video data signal offered from the digital camera 500 is shaped into a common intermediate format (CIF), a quarter CIF (QCIF), or a sub-QCIF in accordance with a 4:2:0 video recording system (YUV system) format. The digital video data signal is sent to the DSP 230 with these clock signals containing the frame information of the digital camera 500. The DSP 230 sends the address of the memory 260 and these control signals to the memory for writing the digital video data signal on the memory at a rate of 30 frames per second. The DSP 230 appoints an inner register for these zooming and focusing functions of the digital camera 500. The DSP 230 also executes these control operations for these several operations of the digital camera 500. In execution of the visual communication, the DSP 230 reads out the frame currently stored in the memory 260. While the frame is being stored in the memory, the DSP 230 waits for the storing of the frame and reads out the stored frame to be completed. The microphone 600 sends the analog audio signal for the visual communication to the DSP 230. The DSP 230 converts the digital audio data signal transmitted from the host 100 into the analog audio signal which is then sent to the speaker unit 700 and 701 through an amplifier 270. The USB hub system comprises a USB control unit 250 and several hub ports such as the upstream port UP1 and the downstream ports DP1, DP2 and DP3. The USB hub control unit 250 is coupled to the DSP 230 with a parallel communication connection via parallel-serial/serial-parallel converter 256 for transferring these data and control signals. The USB hub control unit 250 executes control operations in response to these data and control signals via the hub ports and a root hub RH1 included in the host 100. The USB control unit 250 acquires an input data signal from the host 100 through the upstream port UP1 and repeats the data signal to the downstream ports DP1, DP2 and DP3. The UP1 is upstream port receives the voltage and the data transmitted from the host 100 through the root hub RH1. The downstream ports DP1, DP2 and DP3 transfer the data and the voltages to the USB devices such as the keyboard 400, the mouse 300 and a printer (not shown). The power supply unit 210 has an efficient power saving function and supplies a variety of voltages to the monitor 200 such as +80V, +150V, +24V, +12V and +5V. Especially, the voltage of +5V is the power of these downstream ports from DP1 to DP3 of the hub system included in the monitor 200.

Figure 7:
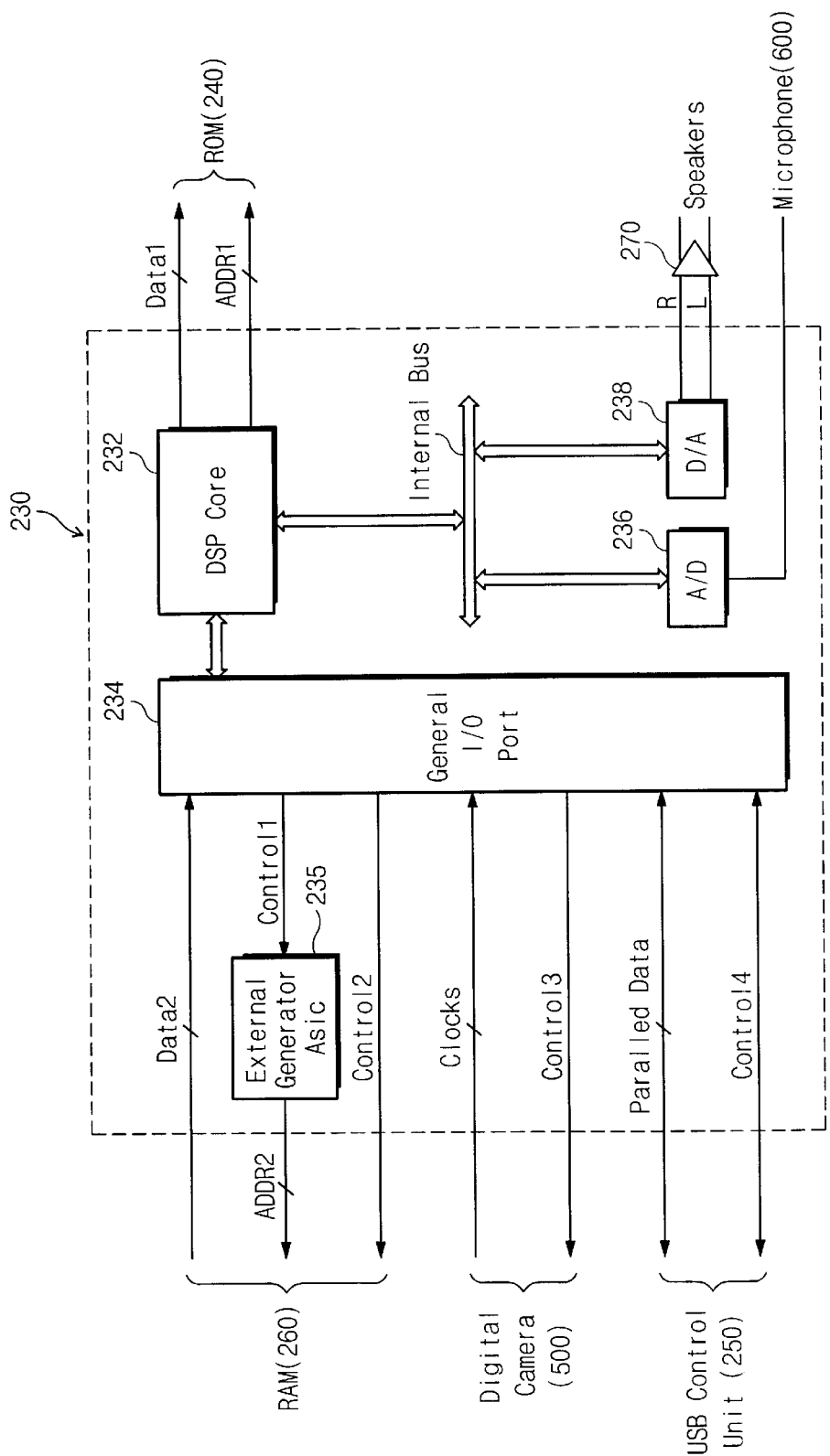
FIG. 7 is a block diagram illustrating a configuration of a DSP shown in FIG. 6.

FIG. 7 illustrates a detailed configuration of the DSP 230 included in the display apparatus for the general visual communication according to the present invention. The DSP 230 operates by the program stored in the ROM 240. As shown in FIG. 7, the DSP 230 comprises a DSP CORE 232, a general I/O port 234, an A/D converter 236 and a D/A converter 238. The detailed circuit of the DSP 230 executes the video and audio data signal processing by the control operation of the DSP CORE 232 through an internal bus included in the detailed circuit of the DSP 230 for transmitting these data and control signals. The DSP 230 also comprises an address generator ASIC 235 (which also may be an external component) for reading and writing the stored video data signal in the memory. For a time management of the memory reading out operation, the address generator ASIC 235 is located in between RAM 260 and the general I/O port 234 and generates the address ADDR2 by the acquired control signal CONTROL1 from the DSP CORE 232. The DSP CORE 232 executes overall operations of the DSP by the program in the ROM 240. The DSP CORE 232 executes the visual communication mode operation or common mode operation. The general I/O port 234 composes a video data signal transmitter (not shown) and an audio data signal transmitter (not shown). The video data signal transmitter transfers the video data signal from the RAM 260 to the USB control unit 250. The audio data signal transmitter receives the audio data signal from the A/D converter 240 or the USB control unit 250. The digital audio data signal acquired from the A/D converter 240 or the USB control unit 250 is adjusted from the sound effect function such as the stereo sound, the tone and the balance. The general I/O port 234 receives the audio data signal acquired from the microphone 600 and the video data signal read out from the memory 260 controlled by the DSP CORE 232 with parallel or transfers the audio data signal from the USB control unit 250 to the speaker unit 700 and 701. The A/D converter 240 converts received the analog audio signal acquired from the microphone 600 into the digital audio data signal and transfers to the general I/O port 234. In using the visual communication mode or a Noraebang mode, the A/D converter 240 converts the analog audio signal acquired from the microphone 600 into the digital audio data signal for transmitting to the host 100. The host 100 transfers the international standard form video data signal for the visual communication through a communication interface unit such as a modem. In that case, the audio data signal for the visual communication is converted from the analog signal to the digital data signal through a data sampling process because the international standard form audio signal for the visual communication demands 16 bit resolution of the digital audio data signal. The D/A converter 242 converts the digital audio data signal which transferred from the host 100 through the USB control unit 250 into the analog audio signal and transfers to the amplifier 270. The amplifier 270 transfers the analog audio signal to the speaker unit 700 and 701.

Figure 8:
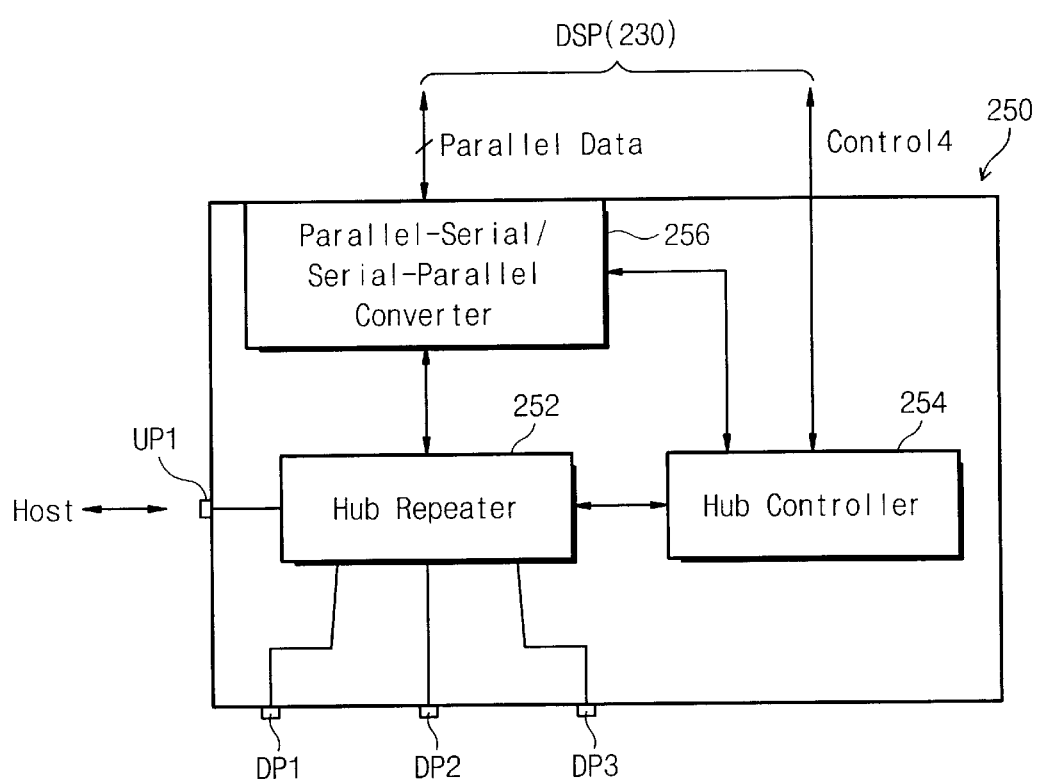
FIG. 8 is a block diagram illustrating a configuration of a USB control unit shown in FIG. 6.

Referring FIG. 8, the USB control unit 250 composes a hub controller 254, a hub repeater 252 and a parallel-serial/serial-parallel converter 256. The hub repeater 252, the USB protocol control switch, is located in between the upstream port UP1 and the downstream ports DP1, DP2 and DP3. The hub repeater 252 has hardware supporting devices for transferring these signals between the ports. The hub controller 254 comprises an interface register (not shown). The interface register communicates with the host 100 in response to the control signal transferred from the DSP 230 or the host 100 for executing the visual communication mode operation or the common mode operation. Accordingly, the hub controller 254 controls data transmission between the host 100 and the DSP 230 through the interface register and manages a speed of data communication and power supplying of these USB devices coupled to the hub port DP1, DP2 and DP3. The serial-parallel/parallel-serial converter 256 converts the serial format data input into the parallel format data output of these video and audio data signals transferred from the hub repeater 252, or converts the parallel format data input into the serial format data output of these video and audio data signals transferred from the DSP 230 by the USB protocol. The flowchart of the processing of DSP 230 is illustrated in FIG. 9.

Referring FIG. 9, in step S900, the DSP 230 begins initializing as the power is supplied to the monitor 200. In step S902, the DSP 230 receives prescribed the control signal (CONTROL4) from the host 100 to the general I/O port 234 via the USB control unit 250. In step S904, the DSP 230 decides the operation of the visual communication mode or the common mode by the control signal (CONTROL4). In other words, the DSP 230 considers executing of the visual communication or the audio data processing. In visual communication mode, the current step moves to step S906. In step S906, the DSP 230 controls the digital camera 500 and the memory 260 for the read/write operation of the video data signal and processes the audio data signal acquired from the microphone 600. In step S908, the DSP 230 transfers these video and audio data signals with parallel to the USB control unit 250. The USB control unit 250 converts the parallel data signal into the serial data signal and transfers these data signals to the host 100 by the USB protocol. The current step moves to step S910 when the control signal (CONTROL4) indicates the common mode in step S904. In step S910, the DSP 230 receives the audio data signal from the host 100 and executes the sound effect function in step S912. As mentioned above, the monitor 200 supplies these video and audio data signals to the host 100 through the USB hub system and executes the visual communication through the communication interface included in the host 100.

While the invention has been particularly shown and described with reference to a preferred embodiment, it will be understood by those skilled in the art that modifications in detail may be made without departing from the spirit and scope of the invention.

What is claimed is:

1. A monitor for a visual communication system, said monitor being coupled to a host included in the visual communication system, and said monitor being provided with a universal serial bus (USB) hub in order to enable visual communication through the host, said monitor comprising:

a digital camera for generating a digital video data signal;

a memory for storing the digital video data signal;

a digital signal processor(DSP) for controlling a digital camera operation and a read/write operation of the memory while controlling digital video data signal transference between the memory and the host; and a USB control unit for controlling digital video data signal transmission between the host and the DSP through at least one USB hub port, wherein the DSP comprises an interface unit for operating parallel data transmission with the USB control unit and the USB control unit comprises:

a plurality of USB hub ports;

a hub repeater for executing serial data transmission with the plurality of hub ports;

a hub controller for controlling a data transfer operation in response to a control signal of the DSP; and a serial-parallel/parallel-serial converter for executing serial to parallel and parallel to serial data conversion between the DSP and the hub repeater.

2. The monitor as set forth in claim 1, wherein the interface unit comprises a general I/O port.

3. The monitor as set forth in claim 1, wherein the interface unit comprises:
   a video data signal transmitter for transferring the digital video data signal from the memory to the USB control unit; and
   an audio data signal transmitter for receiving an audio data signal from outside and transmitting the audio data signal to the USB control unit.

4. The monitor as set forth in claim 1, wherein the DSP comprises an address generator for generating an address signal to control the read/write operation of the memory.

5. The monitor as set forth in claim 1, wherein the monitor further comprises:
   at least two additional USB hub ports respectively connected to a keyboard and a mouse.

6. The monitor as set forth in claim 1, wherein the DSP receives a control signal supplied from the host through the USB control unit so as to execute a visual communication mode/common mode.

7. The monitor as set forth in claim 2, wherein the DSP responsive to the control signal executes a digital video data signal processing in a visual communication mode and executes an audio data signal processing in a common mode.

8. The monitor as set forth in claim 1, wherein the DSP comprises:
   an analog/digital(A/D) converter for converting an analog audio signal into a digital audio data signal; and
   a digital/analog(D/A) converter for converting the digital audio data signal into the analog audio signal.

9. The monitor as set forth in claim 8, wherein the monitor comprises:
   a microphone connected with the A/D converter;
   an amplifier connected with the D/A converter for amplifying the analog audio signal; and
   a speaker unit connected with the amplifier.

10. The monitor as set forth in claim 9, wherein the DSP further comprises means for adjusting a sound effect associated with the audio data signal.

11. A monitor comprising:
    a digital camera for generating a digital video data signal;
    a memory for storing the digital video data signal;
    a digital signal processor(DSP) for controlling a digital camera operation and a read/write operation of the memory while controlling digital video data signal transference between the memory and a host;
    a USB control unit for controlling digital video data signal transmission between said host and the DSP, said USB control unit comprising:
       a plurality of USB hub ports, one of said USB hub ports being connected to said host;
       a hub repeater for executing serial data transmission with the plurality of hub ports;
       a hub controller for controlling a data transfer operation in response to a control signal of the DSP; and
       a serial-parallel/parallel-serial converter for executing serial to parallel and parallel to serial data conversion between the DSP and the hub repeater.

12. The monitor as set forth in claim 11, said USB control unit further comprising:
    a second one of said USB hub ports being connected to a keyboard; and
    a third one of said USB hub ports being connected to a mouse.

13. The monitor as set forth in claim 11, wherein the DSP receives an audio data signal from the host and executes a sound effect function, when said control signal is not indicative of a visual communication mode.

14. The monitor as set forth in claim 11, wherein the DSP determines whether a control signal received from said host is a control signal indicative of a visual communication mode, said DSP executing a digital video data signal processing when said control signal is indicative of the visual communication mode and executes an audio data signal processing when said control signal is not indicative of a visual communication mode.

15. The monitor as set forth in claim 14, wherein the DSP controls said digital camera, controls a read/write operation of said memory for reading or storing the digital video data signal and processes an audio data signal acquired from a microphone, when said control signal is indicative of the visual communication mode.

16. The monitor as set forth in claim 15, wherein the DSP transfers, in parallel format, the digital video data signal read from the memory and the audio data signal acquired from the microphone to said USB control unit.

17. The monitor as set forth in claim 16, wherein the USB control unit performs parallel to serial conversion of the digital video data signal and the audio data signal for transmitting serial video and audio data to said host.

* * * * *